United States Patent
Ueda et al.

(10) Patent No.: US 12,001,859 B1
(45) Date of Patent: Jun. 4, 2024

(54) DRIVER PLUGIN WRAPPER FOR CONTAINER ORCHESTRATION SYSTEMS

(71) Applicant: INTERNATIONAL BUSINESS MACHINES CORPORATION, Armonk, NY (US)

(72) Inventors: Yohei Ueda, Shinagawa (JP); Da Li Liu, Beijing (CN); Qi Feng Huo, Haidian District (CN); Lei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 18/054,289

(22) Filed: Nov. 10, 2022

(51) Int. Cl.
*G06F 9/445* (2018.01)
*G06F 9/54* (2006.01)

(52) U.S. Cl.
CPC .......... *G06F 9/44526* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 10,908,926 B2 | 2/2021 | Coven | |
| 2007/0226617 A1* | 9/2007 | Traub | H04L 67/75 340/572.1 |
| 2011/0138476 A1* | 6/2011 | Black | G06F 21/57 726/27 |
| 2011/0157189 A1* | 6/2011 | Diard | G06T 1/00 345/502 |
| 2022/0027217 A1 | 1/2022 | Thoemmes | |
| 2022/0035574 A1 | 2/2022 | Cain | |
| 2022/0283864 A1* | 9/2022 | Kwon | G06F 11/3442 |
| 2022/0391224 A1* | 12/2022 | Pinto | G06F 9/541 |

OTHER PUBLICATIONS

No Author, "Container Storage Interface (CSI) drivers on Azure Kubernetes Service (AKS)", Jul. 27, 2022, 6 PGS, <https://docs.microsoft.com/en-us/azure/aks/csi-storage-drivers>.

(Continued)

*Primary Examiner* — Umut Onat
(74) *Attorney, Agent, or Firm* — Eric W. Chesley

(57) ABSTRACT

Described are techniques for modifying existing driver plugin behavior using a plugin wrapper to enable driver compatibility with an unsupported container deployment model. The techniques include intercepting, by a plugin wrapper operating as part of a container orchestration system, an allocation request intended for a driver plugin, where the allocation request is for allocating a computing resource to a containerized application deployed using a container deployment model not supported by the driver plugin. The techniques further include modifying, by the plugin wrapper, the allocation request to correspond to specifications of the container deployment model, thereby forming a modified request to allocate the computing resource to the containerized application. The techniques further include sending, by the plugin wrapper, the modified request to the driver plugin to allow the driver plugin to allocate the computing resource to the containerized application using the specifications of the container deployment model.

20 Claims, 5 Drawing Sheets

(56) References Cited

OTHER PUBLICATIONS

No Author, "Deploying CSI Driver on Kubernetes", Accessed Sep. 28, 2022, 6 PGS, <https://kubernetes-csi.github.io/docs/deploying.html>.

No Author, "Drivers", Drivers—Kubernetes CSI Developer Documentation, Accessed Sep. 28, 2022, 24 PGS, <https://kubernetes-csi.github.io/docs/drivers.html>.

No Author, "Introduction of Kubernetes Container Storage Interface (CSI) Documentation", Accessed Sep. 28, 2022, 3 PGS, <https://kubernetes-csi.github.io/docs/introduction.html>.

No Author, "Persistent Volumes", 19 PGS, Accessed Sep. 28, 2022, <https://kubernetes.io/docs/concepts/storage/persistent-volumes/#persistentvolumeclaims>.

* cited by examiner

DRIVER PLUGIN WRAPPER FOR CONTAINER ORCHESTRATION SYSTEMS

BACKGROUND

The present disclosure relates to driver plugin wrappers for container orchestration systems and, more specifically, to modifying existing driver plugin behavior using a plugin wrapper to enable driver compatibility with an unsupported container deployment model.

Containers are a method of building, packaging, and deploying software. In the simplest terms, a container includes both application code and the dependencies that the application code needs to run properly. Multiple containers (also called containerized applications) can run on the same machine and share an operating system (OS) kernel with other containers, each running as isolated processes in a user space. Container orchestration is the automation of operational tasks needed to run containerized applications and services. These operational tasks include management of a container's lifecycle, such as container provisioning, deployment, scaling (up and down), networking, and load balancing.

SUMMARY

Aspects of the present disclosure are directed toward a computer-implemented method comprising intercepting, by a plugin wrapper operating as part of a container orchestration system, an allocation request intended for a driver plugin, where the allocation request is for allocating a computing resource to a containerized application deployed using a container deployment model that is not supported by the driver plugin. The computer-implemented method further comprising modifying, by the plugin wrapper, the allocation request to correspond to specifications of the container deployment model, thereby forming a modified request to allocate the computing resource to the containerized application deployed using the container deployment model. The computer-implemented method further comprising sending, by the plugin wrapper, the modified request to the driver plugin to allow the driver plugin to allocate the computing resource to the containerized application using the specifications of the container deployment model.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
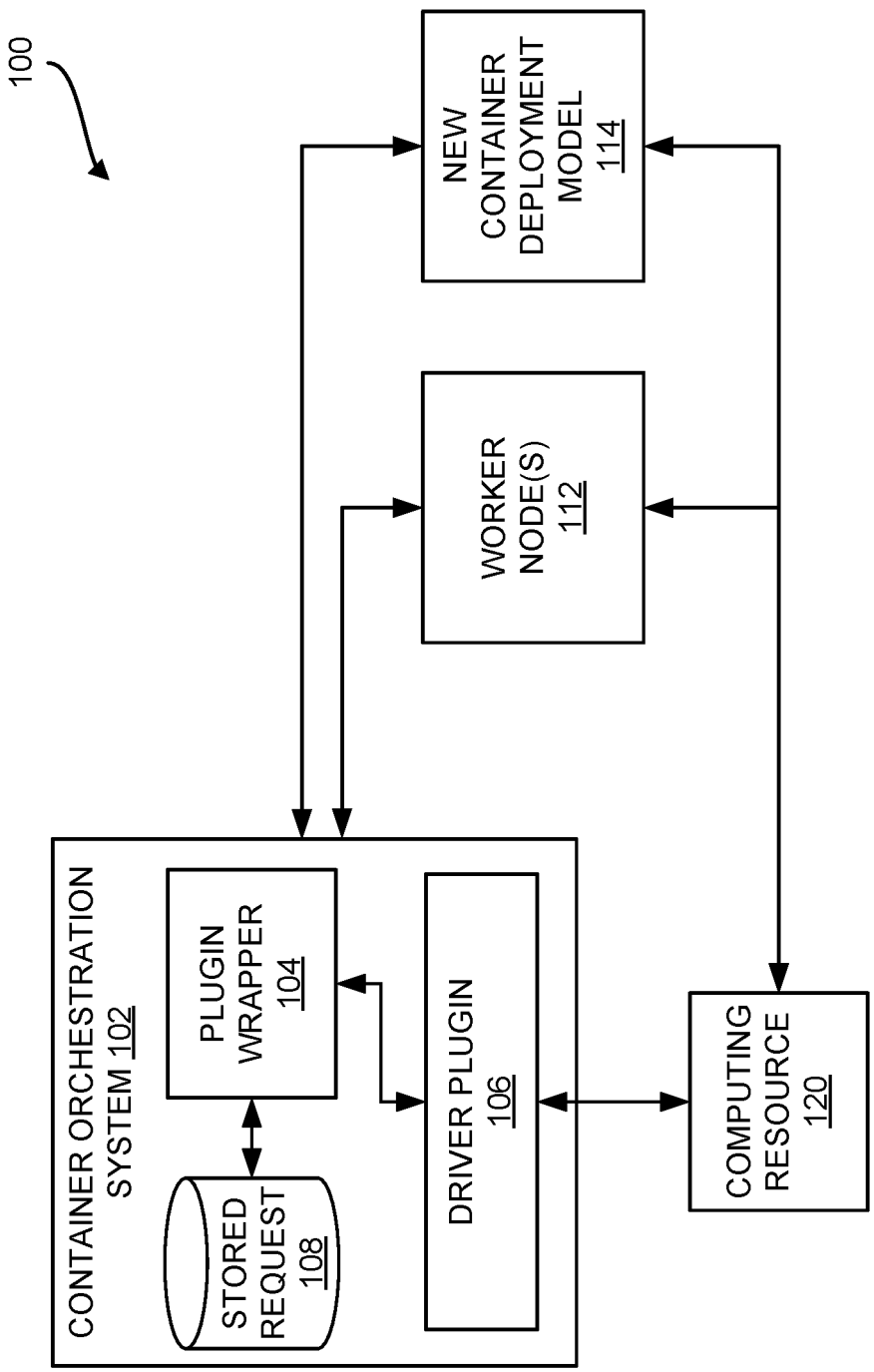
FIG. 1 is a block diagram illustrating a high-level example of a computing environment that implements a driver plugin wrapper for a container orchestration system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward driver plugin wrappers for container orchestration systems. While not limited to such applications, embodiments of the present disclosure may be better understood in light of the aforementioned context.

Container orchestration systems provide mechanisms to extend container capabilities using driver plugins. In the context of these container orchestration systems, driver plugins make various device resources (e.g., hardware and virtualized hardware) available to containers managed by the container orchestration systems. The container orchestration systems provide a driver plugin framework that advertises the device resources to the containers. As an example, driver plugins can expose block and file storage systems to the containers, including cloud storage provided by third-party storage providers. As another example, driver plugins can expose devices to the containers that include, but are not limited to: graphics processing units (GPUs), network interface controllers (NICs), field-programmable field arrays (FPGAs), as well as other devices that can be utilized by containerized applications.

Because containers are lightweight and ephemeral by nature, managing them can quickly become a massive effort. For example, a containerized application might translate into hundreds or thousands of containers, especially when building and operating any large-scale system. While container orchestration systems help manage the operational complexity of these large-scale systems, prior to the present disclosure, a driver plugin had to be manually configured when implementing a new type of container deployment model not supported by the existing driver plugin. As an example, prior to the present disclosure, enhancing a container orchestration system to deploy containers using a new type of container deployment model (e.g., a model of deploying containers to a virtual machine (VM) instance instead of to a worker node) required manual modification of a driver plugin (e.g., modification of IP addresses and port numbers) to enable provisioning of a computing resource to the containers.

Advantageously, aspects of the present disclosure overcome these challenges using a driver plugin wrapper (also referred to herein as a plugin wrapper) that modifies existing driver plugin behavior within a container orchestration system to support a container deployment model that is not supported by the existing driver plugin. More specifically, aspects of the present disclosure intercept an allocation request sent to a driver plugin that is configured to allocate a computing resource (e.g., storage device, networking device, processing device, etc.) to a containerized application managed by the container orchestration system. The allocation request is intercepted by the plugin wrapper, which operates as part of the container orchestration system, and the allocation request is for allocating the computing resource to the containerized application deployed (or to be deployed) using a container deployment model that is not supported by the driver plugin. In some aspects of the present disclosure, the allocation request can be stored in computer memory for a time that allows the resources used for the container deployment model to become active (e.g., a time to create and start a virtual machine). After intercepting the allocation request, aspects of the present disclosure modify the allocation request to correspond to the specifications of the resources used for the container deployment model. By modifying the allocation request, the plugin wrapper generates a modified allocation request to provision the computing resource to the containerized application deployed (or to be deployed) using the container deployment model. Thereafter, aspects of the present disclosure send the modified allocation request to the existing driver plugin to enable the existing driver plugin to allocate the computing resource to the containerized application using the resource specifications of the container deployment model.

Referring now to the figures, FIG. 1 illustrates a block diagram of a high-level example of a computing environment 100 used to implement a driver plugin wrapper 104 for a container orchestration system 102, in accordance with some embodiments of the present disclosure. Container orchestration automates the deployment, management, scaling, and networking of containers (also referred to herein as containerized applications). Containers are a method of building, packaging and deploying software. Containers offer many benefits, including the portability of containers between different computing environments. This makes containerized applications easier to move between computing environments (e.g., cloud environments) without having to rewrite large amounts of computer code to ensure that the computer code will execute properly, regardless of the underlying operating system, or other factors. However, containers introduce a large amount of complexity that can become difficult to manage.

Container orchestration systems manage the complexity associated with containers. For example, a container orchestration system 102 can deploy containerized applications (not shown) across different computing environments without needing to redesign the application. As illustrated in FIG. 1, the container orchestration system 102 manages worker nodes 112, which can comprise a cluster (or grouping) of worker nodes 112 that execute the containerized applications. A worker node 112 can be a virtual or physical machine configured to host the containerized applications and handle networking to ensure that network traffic between the containerized applications is properly facilitated.

The container orchestration system 102 also manages services utilized by the containerized applications executing on the worker nodes 112, including storage, networking, and security. To facilitate these services, the container orchestration system 102 includes a driver plugin framework for providing computing resources 120 to the containerized applications. The computing resources 120 include any devices (hardware and virtualized hardware) that can be accessed from a computer system. A driver plugin 106 used by the container orchestration system 102 allocates a computing resource 120 (e.g., local storage, cloud storage, GPU, NIC, FPGA, etc.) to a containerized application by registering the computing resource 120 with the container orchestration system 102 (e.g., registering an application programming interface (API) endpoint), which allocates the computing resource 120 to the containerized application, enabling the containerized application to access the computing resource 120.

Container orchestration systems can be enhanced by defining new types of container deployment models. Container deployment is the act of pushing (or deploying) containers to a target environment, such as a cloud or on-premises server. An existing, or traditional, deployment model used by the container orchestration system 102 deploys containers to a worker node 112 or worker machine. A new container deployment model 114 defines a new type of container deployment model for use by the container orchestration system 102. The new container deployment model 114 may specify a target computing environment that is not supported by an existing driver plugin 106 used by the container orchestration system 102. For example, the existing driver plugin 106 may be configured to allocate a computing resource 120 to containerized applications executing on a worker node 112, but the existing driver plugin 106 may not be configured to allocate the computing resource 120 to containerized applications deployed to a different target environment, such as an instance of a virtual machine. In order to avoid having to manually update the driver plugin 106 (as well as every other driver plugin used by the container orchestration system 102) to work with the virtual machine instance, a plugin wrapper 104 can be used to modify the behavior of the existing driver plugin 106 to enable driver compatibility with the virtual machine instance.

Accordingly, as shown, the container orchestration system 102 includes a plugin wrapper 104 for an existing driver plugin 106. The plugin wrapper 104 intercepts an allocation request for a computing resource 120 sent to the existing driver plugin 106 and modifies the allocation request to correspond to the specifications of a target environment (e.g., virtual machine instance IDs, internet protocol (IP) addresses and port numbers) defined by the new container deployment model 114. An allocation request can comprise a request to allocate a computing resource 120 (e.g., via mount/attach operations) to a containerized application deployed to the target environment of the new container deployment model 114. In some embodiments, the plugin wrapper 104 can be associated with a specific driver plugin (e.g., a cloud storage driver plugin). For example, allocation requests sent to a container storage interface (CSI) driver can be intercepted and modified using a CSI plugin driver. In other embodiments, the plugin wrapper 104 can provide wrapper functionality for a plurality of existing driver plugins, such that the plugin wrapper 104 can intercept and modify allocation requests sent to any one of the existing driver plugins 106.

As part of modifying an allocation request sent to the existing driver plugin 106, the plugin wrapper 104 obtains resource specifications for the target environment of the new container deployment model 114, such as virtual machine instance IDs, IP addresses and port numbers. The resource specifications can be obtained from the resources themselves (e.g., via API calls), or the specifications can be obtained from other sources, such as a resource manager of the container orchestration system 102. the plugin wrapper 104 creates a modified allocation request by replacing existing resource specifications in the original allocation request with the resource specifications of the target environment of the new container deployment model 114.

In some embodiments, a target environment of a new container deployment model 114 may not be ready (not running) at the time that an allocation request is received by the container orchestration system 102. For example, the resources of the target environment may be loading, and as such, the plugin wrapper 104 may not be able to obtain the resource specifications at the time that the plugin wrapper 104 intercepts the allocation request. Accordingly, in some embodiments, after intercepting the allocation request, the plugin wrapper 104 caches the allocation request (shown as stored request 108 in FIG. 1) in computer memory for a time that allows the resources of the target environment to become ready (running). That is, the allocation request can be stored for an amount of time (e.g., a few seconds to a few minutes) needed for the resources of the target environment to be created and started (e.g., a time to create and start a virtual machine instance). After determining that the resources of the target environment are active, the plugin wrapper 104 can obtain the resource specifications of the target environment using one of the methods described above. Thereafter, the plugin wrapper 104 can retrieve the allocation request from the computer memory and create a modified allocation request from the original allocation request and the resource specifications of the target environment of the new container deployment model 114.

In some embodiments, preserving the allocation request during a time needed to create and start a target environment of the new container deployment model 114 can include storing the allocation request to an API object. For example, as described in more detail in association with FIG. 2 below, the container orchestration system 102 can include an API server (shown in FIG. 2) used for communicating requests between components of the container orchestration system 102. The API server can create an API object that is accessible to the plugin wrapper 104, and the API server can store the allocation request to the API object to preserve the allocation request while waiting for a target environment of a new container deployment model 114 to be ready. Also, in some embodiments, when the resource specifications or properties (e.g., identifier, IP address, state, etc.) of the target environment become available (e.g., the resources of the target environment are up and running), the resource specifications can be stored to the API object to make the resource specifications available to the plugin wrapper 104. Thereafter, the plugin wrapper 104 can obtain the allocation request and the resource specifications from the API object via an API request and modify the allocation request with the resource specifications. Additionally, in some embodiments, after a computing resource 120 has been allocated to a containerized application deployed using the new container deployment model 114, the API object can be updated to represent the state of the containerized application as having access to the computing resource.

Figure 2:
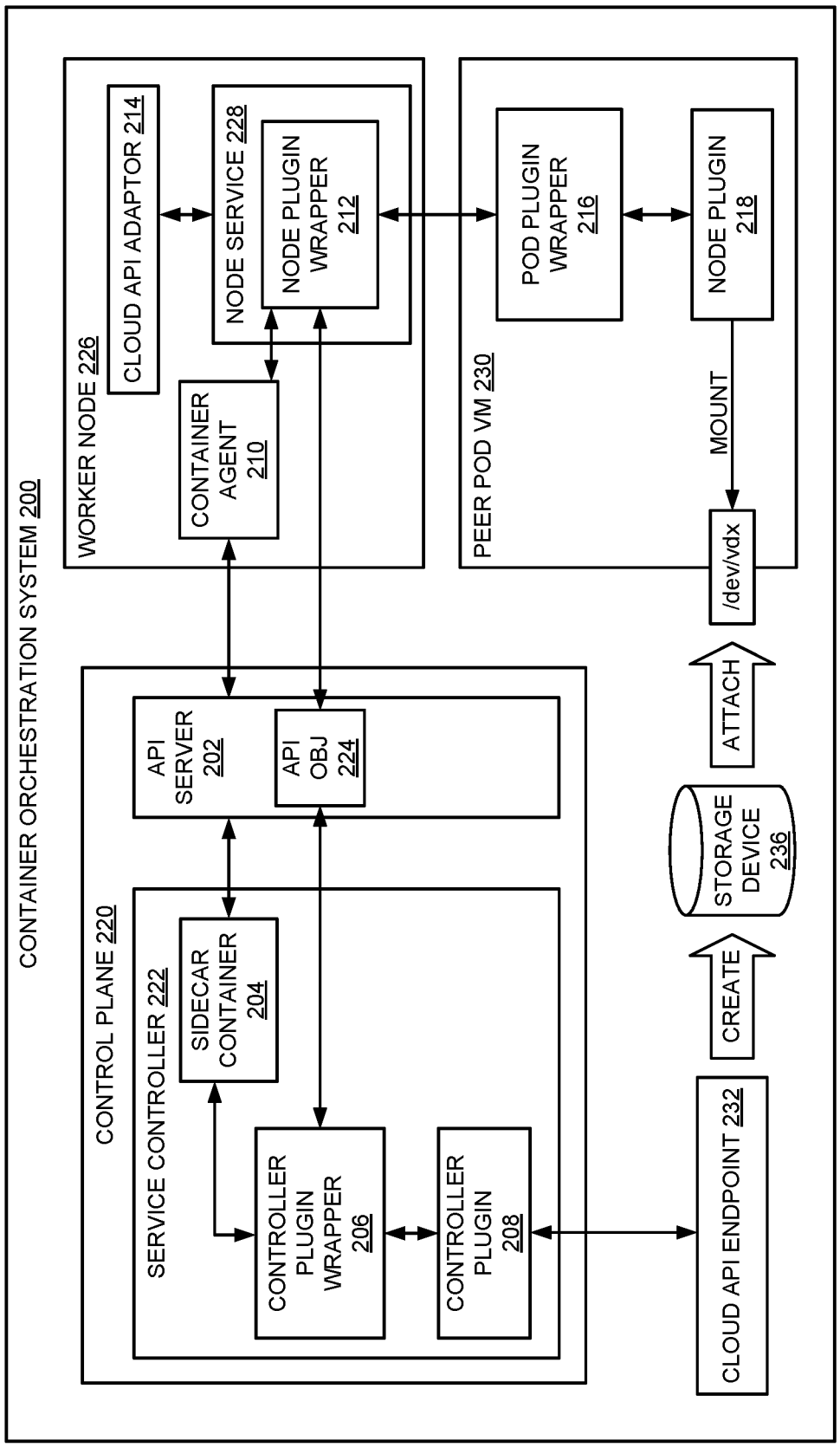
FIG. 2 is a block diagram that illustrates example components of a container orchestration system configured to intercept and modify an allocation request, in accordance with some embodiments of the present disclosure.

FIG. 2 is a block diagram illustrating components of an example container orchestration system 200 for modifying an allocation request using a plugin wrapper, in accordance with some embodiments of the present disclosure. The container orchestration system 200 includes a control plane 220 and one or more worker nodes 226, which can be grouped into clusters. The worker node(s) 226 can be a virtual or physical machine that hosts one or more containerized applications. Containerization of an application comprises packaging software code with operating system (OS) libraries and dependencies needed to run the code to create a single lightweight executable (a container) which executes on any computing infrastructure. In the context of KUBERNETES®, a worker node 226 hosts a pod, which is the smallest, most basic deployable object that represents a single instance of a running process. Pods contain one or more containers, which are managed as a single entity and share the pod's resources.

The control plane 220 manages worker nodes 226 and pods (e.g., peer pod virtual machine (VM) 230) included in a cluster. The control plane 220 detects and responds to cluster events, including allocation requests for system resources. The control plane 220 includes an API server 202. The API server 202 exposes the container orchestration system 200 to the containers (via a container agent 210), and the API server 202 handles requests from the worker nodes 226, including validating and configuring data for API objects 224. An API object 224 is a persistent entity in the container orchestration system 200 that represent the state of a cluster. The API object 224 describes a containerized application executing on a worker node 226, the system resources available to the containerized application, and policies of the containerized application, such as restart and fault-tolerance policies. The API server 202 allows querying and modifying the information stored to the API object 224.

The control plane 220 includes a service controller 222 that interacts with computing resources available for allocation to containerized applications. In the example shown in FIG. 2, the service controller 222 interacts with a cloud API endpoint 232 to configure an endpoint for cloud storage, though, it will be appreciated that the service controller 222 can be configured to interact with other types of computing resources. The service controller 222 includes a controller plugin 208, a controller plugin wrapper 206, and a sidecar container 204. In this example, the controller plugin 208 is configured to allocate a cloud-based storage device 236 to containerized applications hosted on the worker node 226. The controller plugin wrapper 206 and the sidecar container 204 are configured to extend the functionalities of the controller plugin 208 to allow allocation of the storage device 236 to containerized applications deployed to a target environment (peer pod VM 230) of a new container deployment model without having to modify the codebase of the controller plugin 208. Also, as part of extending the functionality of the controller plugin 208 to allocate the storage device 236 to the containerized applications hosted on the peer pod VM 230, a node plugin wrapper 212 is included in a node service 228 of the worker node 226; and a pod plugin wrapper 216 is loaded onto the peer pod VM 230.

Figure 3:
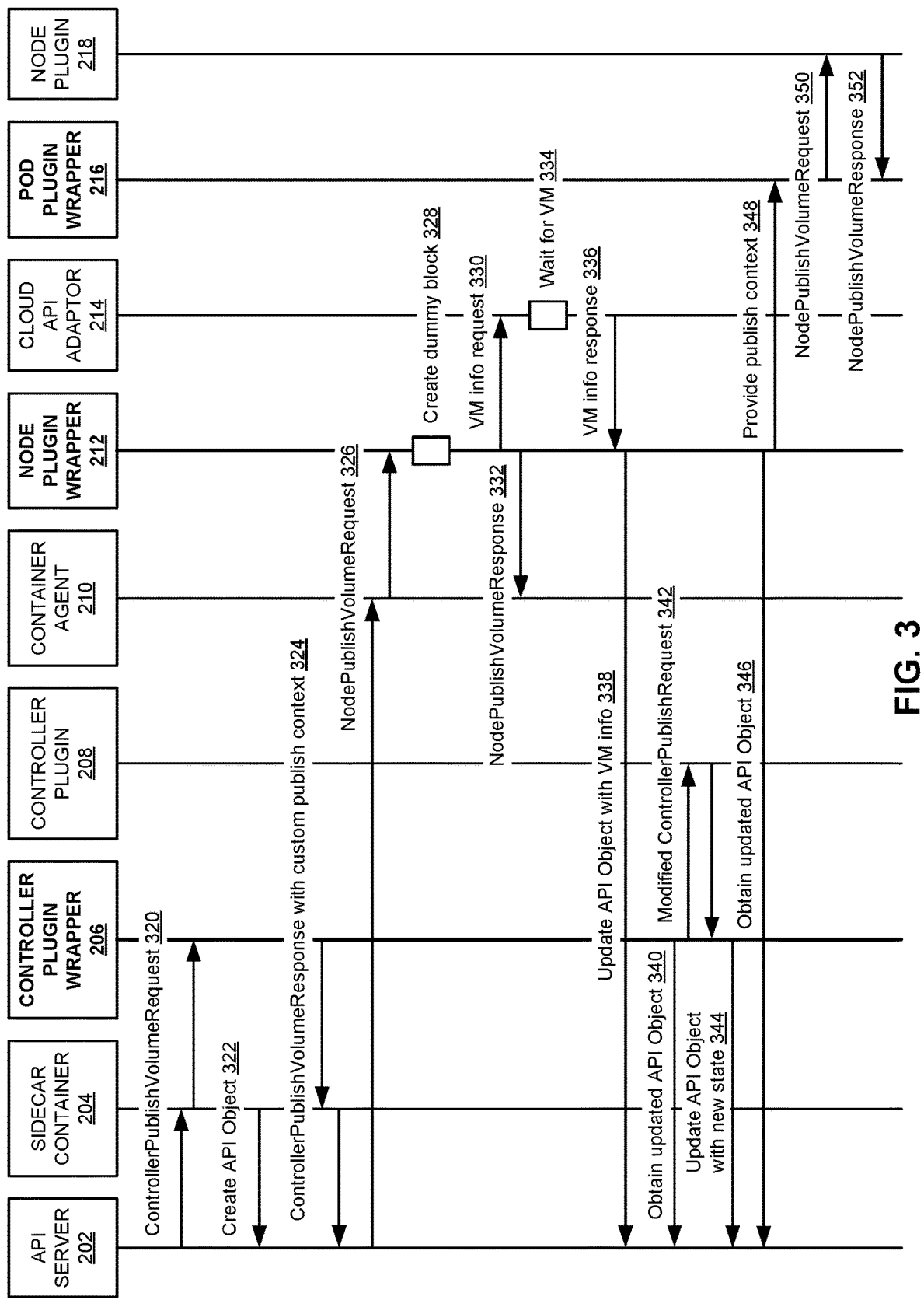
FIG. 3 is a sequence diagram illustrating an example method for intercepting an allocation request and modifying the allocation request to include the specifications of an unsupported container deployment model, in accordance with some embodiments of the present disclosure.

FIG. 3 is a sequence diagram illustrating an example method for intercepting an allocation request for a computing resource and modifying the allocation request to the specifications of a new container deployment model, in accordance with some embodiments of the present disclosure. Referring generally to both FIG. 2 and FIG. 3, as part of deploying a containerized application using a new container deployment model that is not supported by a driver plugin, an allocation request for a computing resource associated with the deployment is intercepted by the controller plugin wrapper 206. For example, as shown in FIG. 3, an allocation request ControllerPublish VolumeRequest 320 intended for the controller plugin 208 can be intercepted by the sidecar container 204, which redirects the ControllerPublish VolumeRequest 320 to the controller plugin wrapper 206. In addition, the sidecar container 204 sends a request to the API server 202 to create 322 an API object to store the ControllerPublish VolumeRequest 320, thereby preserving the allocation request while the resources for the new container deployment model are being created and started.

In response to receiving the ControllerPublish VolumeRequest 320 from the sidecar container 204, the controller plugin wrapper 206 modifies the allocation request with custom publish context to provide a ControllerPublish VolumeResponse 324 with the custom publish context to the sidecar container 204, which sends the ControllerPublish VolumeResponse 324 to the API server 202. The API server 202 processes the ControllerPublish VolumeResponse 324, which causes the API server 202 to send a NodePublish VolumeRequest 326 to the container agent 210 executing on the worker node 226.

The container agent 210 provides the NodePublish VolumeRequest 326 to the node plugin wrapper 212. The node plugin wrapper 212, in response to receiving the NodePublish VolumeRequest 326, creates 328 a dummy block device mount point for the worker node 226 and sends a NodePublish VolumeResponse 332 back to the container agent 210. The dummy block device mount point is needed by NodePublish VolumeResponse 332 to provide a fake (dummy) response that allows the allocation request workflow to be processed as normal.

The node plugin wrapper 212 then sends a VM information request 330 to the cloud API adaptor 214 asking for specifications (e.g., identifier, IP address, state, etc.) of the virtual machine used for the container deployment model. If the virtual machine is not yet available (the virtual machine has not started), the cloud API adaptor 214 waits 334 for the virtual machine to start. When the virtual machine is ready, the cloud API adaptor 214 obtains the specifications for the virtual machine and sends a VM information response 336 back to the node plugin wrapper 212. The node plugin wrapper 212, in response to receiving the VM information response 336, sends an update request to the API server 202 to update 338 the API object with the virtual machine specifications.

The controller plugin wrapper 206 obtains 340 the updated API object from the API server 202 and generates a modified ControllerPublishRequest 342 using the original ControllerPublish VolumeRequest 320 and the virtual machine specifications stored to the API object earlier. The controller plugin wrapper 206 then sends the modified ControllerPublishRequest 342 to the controller plugin 208, which executes the modified ControllerPublishRequest 342. Thereafter, the controller plugin wrapper 206 updates 344 the API object with the new state that results from execution of the modified ControllerPublishRequest 342, thereby caching the state of the modified ControllerPublishRequest 342 in the API object so that it can be reproduced on the peer pod VM 230 when the peer pod VM 230 is ready.

The node plugin wrapper 212 obtains 346 the updated API object from the API server 202 and provides 348 the publish context specified in the original ControllerPublish VolumeRequest 320 to the pod plugin wrapper 216. In response, the pod plugin wrapper 216 sends a NodePublish VolumeRequest 350 to the node plugin 218, and the node plugin 218 processes the NodePublish VolumeRequest 350 and provides a NodePublish VolumeResponse 352 to the pod plugin wrapper 216.

Although the examples described in association with FIG. 2 and FIG. 3 are generally described within the context of the KUBERNETES® container orchestration system, it will be appreciated that the aspects of the present disclosure can be applied to other types of container orchestration systems. That is, while FIG. 2 and FIG. 3 illustrate an example of a system that may implement the techniques above, many other similar or different environments are possible. The example environments discussed and illustrated above are merely representative and not limiting.

Figure 4:
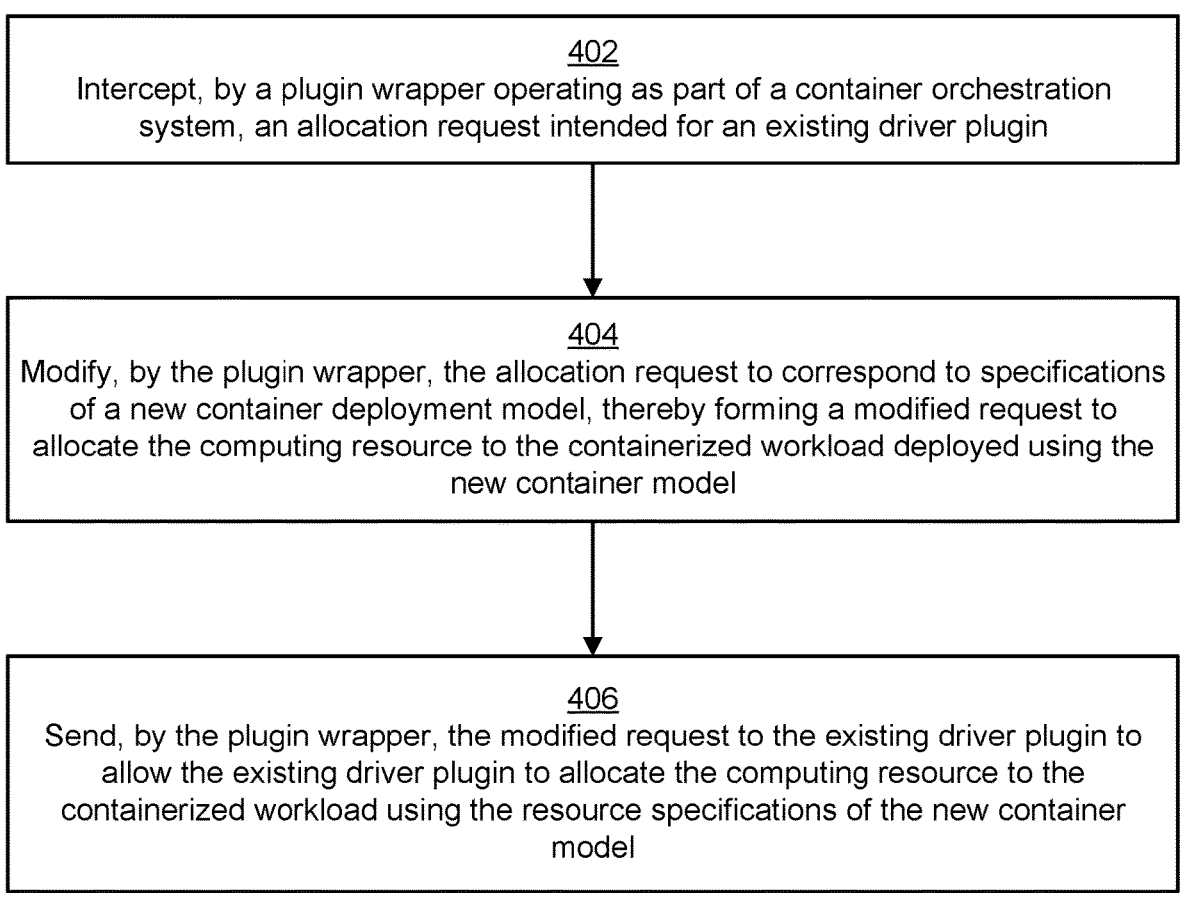
FIG. 4 is a flow diagram illustrating an example method for modifying existing driver plugin behavior using a plugin wrapper to enable driver compatibility with a new container deployment model, in accordance with some embodiments of the present disclosure.

FIG. 4 is a flow diagram illustrating an example method 400 for modifying existing driver plugin behavior using a plugin wrapper to enable driver compatibility with a new container deployment model, in accordance with some embodiments of the present disclosure. Starting with operation 402, a plugin wrapper operating as part of a container orchestration system intercepts an allocation request intended for a driver plugin, where the allocation request is for allocating a computing resource (e.g., storage device, networking device, processing device, etc.) to a containerized application managed by the container orchestration system and deployed (or to be deployed) using a new container deployment model.

In some embodiments, as part of intercepting the allocation request, the method 400 stores the allocation request for a time that allows resources of a target environment of the new container deployment model to become ready. For example, implementing the new container deployment model may include creating and starting a computing resource (e.g., a virtual machine). During a time needed to create and start the computing resource, the intercepted allocation request can be preserved by storing the allocation request in computer memory until the computing resource is ready. In some embodiments, the intercepted allocation request can be stored to an API object. For example, the method 400 can send a request to an API server that operates as part of the container orchestration system requesting that the allocation request be stored to the API object.

In operation 404, the plugin wrapper modifies the intercepted allocation request to correspond to resource specifications of the new container deployment model, thereby forming a modified request to allocate the computing resource to the containerized application on the new container deployment model. For example, the resource specifications of the new container deployment model can replace corresponding specifications in the allocation request. In embodiments where the allocation request is stored for a time that allows a resource of the new container deployment model to become active, the method 400 determines that the resource is active (e.g., via polling) and obtains resource specifications for the resource used by the new container deployment model. The method 400 then retrieves the stored allocation request and modifies the allocation request with the resource specifications to generate the modified allocation request. In embodiments where the allocation request is stored to an API object, the method 400 sends a request for the API object to the API server that operates as part of the container orchestration system and obtains the allocation request from the API object and modifies the allocation request with the resource specifications of the new container deployment model.

In operation 406, the plugin wrapper sends the modified request to the driver plugin to allow the driver plugin to allocate the computing resource to the containerized application using the resource specifications of the new container deployment model. In response to receiving the modified request, the driver plugin executes the modified request causing the computing resource to be allocated to the containerized application executing on the resource of the new container deployment model. In embodiments where API objects are used by the container orchestration system to represent the state of containerized applications managed by the container orchestration system, the method 400 updates an API object associated with the containerized application deployed using the new deployment model to indicate allocation of the computer resource to the containerized application.

Figure 5:
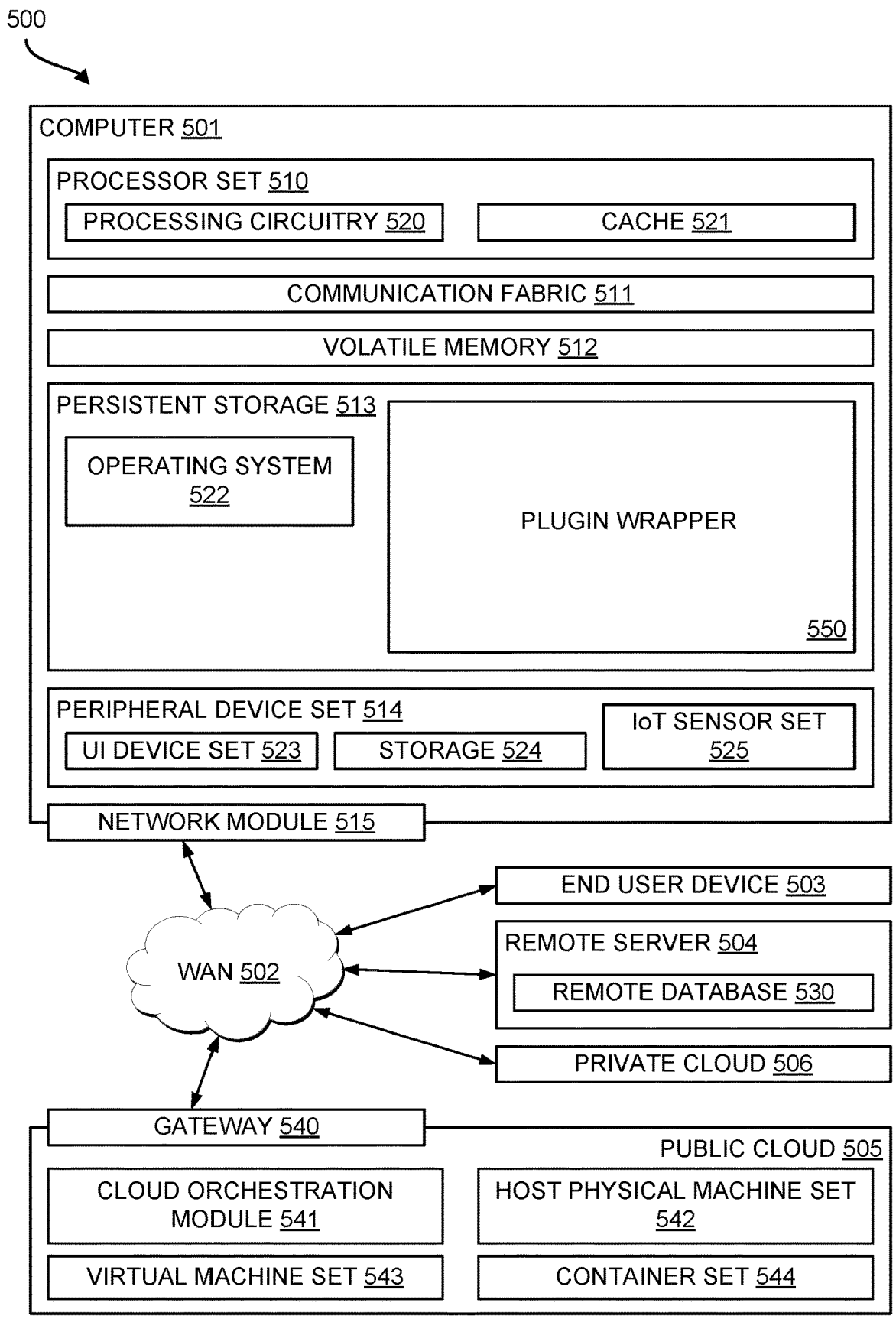
FIG. 5 is a block diagram that illustrates an example computing environment in which aspects of the present disclosure can be implemented, in accordance with some embodiments of the present disclosure.

The method 400 described above can be performed by a computer (e.g., computer 501 in FIG. 5), performed in a cloud environment (e.g., clouds 506 or 505 in FIG. 5), and/or generally can be implemented in fixed-functionality hardware, configurable logic, logic instructions, etc., or any combination thereof. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as block 550 containing computer code for a plugin wrapper that modifies existing driver plugin behavior to enable driver compatibility with an unsupported container deployment model. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The computer readable program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction paths that allow the various components of computer

501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   intercepting, by a plugin wrapper operating as part of a container orchestration system, an allocation request intended for a driver plugin, wherein the allocation request is for allocating a computing resource to a containerized application deployed using a container deployment model that is not supported by the driver plugin;
   modifying, by the plugin wrapper, the allocation request to correspond to specifications of the container deployment model, thereby forming a modified request to allocate the computing resource to the containerized application deployed using the container deployment model; and
   sending, by the plugin wrapper, the modified request to the driver plugin to allow the driver plugin to allocate the computing resource to the containerized application using the specifications of the container deployment model.

2. The computer-implemented method of claim 1, wherein intercepting the allocation request further comprises:
storing the allocation request for a time that allows a target environment of the container deployment model to become ready.

3. The computer-implemented method of claim 2, wherein modifying the allocation request further comprises:
determining that the target environment of the container deployment model is running;
obtaining target environment specifications, which comprise at least a portion of the specifications of the container deployment model; and
obtaining the allocation request from a storage location to allow the allocation request to be modified with the target environment specifications.

4. The computer-implemented method of claim 2, wherein storing the allocation request further comprises:
creating an application programming interface (API) object that is accessible to an API server that operates as part of the container orchestration system; and
storing the allocation request to the API object to preserve the allocation request during the time that allows the target environment of the container deployment model to become ready.

5. The computer-implemented method of claim 4, further comprising storing the specifications of the container deployment model to the API object.

6. The computer-implemented method of claim 5, wherein modifying the allocation request to correspond to the specifications of the container deployment model further comprises:
obtaining the allocation request and the specifications of the container deployment model from the API object via an API request to the API server.

7. The computer-implemented method of claim 1, further comprising:
determining that the computing resource has been allocated to the containerized application; and
updating an API object used by the container orchestration system to represent a state of the containerized application to indicate allocation of the computing resource to the containerized application.

8. A system comprising:
one or more computer readable storage media storing program instructions and one or more processors which, in response to executing the program instructions, are configured to:
intercept, by a plugin wrapper operating as part of a container orchestration system, an allocation request intended for a driver plugin, wherein the allocation request is for allocating a computing resource to a containerized application deployed using a container deployment model that is not supported by the driver plugin;
modify, by the plugin wrapper, the allocation request to correspond to specifications of the container deployment model, thereby forming a modified request to allocate the computing resource to the containerized application deployed using the container deployment model; and
send, by the plugin wrapper, the modified request to the driver plugin to allow the driver plugin to allocate the computing resource to the containerized application using the specifications of the container deployment model.

9. The system of claim 8, wherein the program instructions configured to cause the one or more processors to intercept the allocation request are further configured to cause the one or more processors to:
store the allocation request for a time that allows a target environment of the container deployment model to become ready.

10. The system of claim 9, wherein the program instructions configured to cause the one or more processors to modify the allocation request are further configured to cause the one or more processors to:
determine that the target environment of the container deployment model is running;
obtain target environment specifications, which comprise at least a portion of the specifications of the container deployment model; and
obtain the allocation request from a storage location to allow the allocation request to be modified with the target environment specifications.

11. The system of claim 9, wherein the program instructions configured to cause the one or more processors to store the allocation request are further configured to cause the one or more processors to:
create an application programming interface (API) object that is accessible to an API server that operates as part of the container orchestration system; and
store the allocation request to the API object to preserve the allocation request during the time that allows the target environment of the container deployment model to become ready.

12. The system of claim 11, wherein the program instructions are further configured to cause the one or more processors to:
store the specifications of the container deployment model to the API object.

13. The system of claim 12, wherein the program instructions configured to cause the one or more processors to modify the allocation request to correspond to the specifications of the container deployment model are further configured to cause the one or more processors to:
obtain the allocation request and the specifications of the container deployment model from the API object via an API request to the API server.

14. The system of claim 11, wherein the program instructions are further configured to cause the one or more processors to:
determine that the computing resource has been allocated to the containerized application; and
update an API object used by the container orchestration system to represent a state of the containerized application to indicate allocation of the computing resource to the containerized application.

15. A computer program product comprising:
one or more computer readable storage media, and program instructions collectively stored on the one or more computer readable storage media, the program instructions configured to cause one or more processors to:
intercept, by a plugin wrapper operating as part of a container orchestration system, an allocation request intended for a driver plugin, wherein the allocation request is for allocating a computing resource to a containerized application deployed using a container deployment model that is not supported by the driver plugin;
modify, by the plugin wrapper, the allocation request to correspond to specifications of the container deployment model, thereby forming a modified request to allocate the computing resource to the containerized application deployed using the container deployment model; and send, by the plugin wrapper, the modified request to the driver plugin to allow the driver plugin to allocate the computing resource to the containerized application using the specifications of the container deployment model.

16. The computer program product of claim 15, wherein the program instructions configured to cause the one or more processors to intercept the allocation request are further configured to cause the one or more processors to:

store the allocation request for a time that allows a target environment of the container deployment model to become ready.

17. The computer program product of claim 16, wherein the program instructions configured to cause the one or more processors to modify the allocation request are further configured to cause the one or more processors to:

determine that the target environment of the container deployment model is running;

obtain target environment specifications, which comprise at least a portion of the specifications of the container deployment model; and obtain the allocation request from a storage location to allow the allocation request to be modified with the target environment specifications.

18. The computer program product of claim 16, wherein the program instructions configured to cause the one or more processors to store the allocation request are further configured to cause the one or more processors to:

create an application programming interface (API) object that is accessible to an API server that operates as part of the container orchestration system; and store the allocation request to the API object to preserve the allocation request during the time that allows the target environment of the container deployment model to become ready.

19. The computer program product of claim 18, wherein the program instructions are further configured to cause the one or more processors to:

store the specifications of the container deployment model to the API object.

20. The computer program product of claim 19, wherein the program instructions configured to cause the one or more processors to modify the allocation request to correspond to the specifications of the container deployment model are further configured to cause the one or more processors to:

obtain the allocation request and the specifications of the container deployment model from the API object via an API request to the API server.

* * * * *